J. C. JENSEN.
Coffee-Percolator.
No. 199,445.   Patented Jan. 22, 1878.
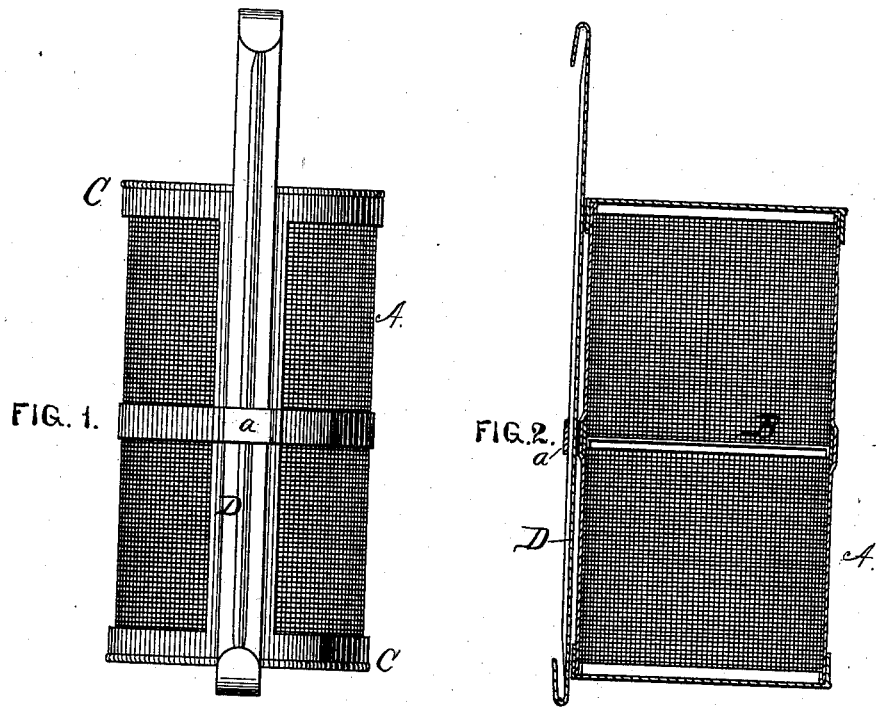
WITNESSES:
Forde R. Smith
E. Raymondelin
INVENTOR:
John C. Jensen
by Munday & Evarts
his attys.

UNITED STATES PATENT OFFICE.

JOHN C. JENSEN, OF CHICAGO, ILLINOIS.

IMPROVEMENT IN COFFEE-PERCOLATORS.

Specification forming part of Letters Patent No. 199,445, dated January 22, 1878; application filed December 6, 1877.

*To all whom it may concern:*

Be it known that I, JOHN C. JENSEN, of Chicago, in the county of Cook and State of Illinois, have invented certain Improvements in Coffee-Percolators, of which the following is a specification:

My improved percolator is one of the class which is intended to be suspended within the coffee-pot and below the line of the water therein. It is constructed with open-work sides, so that the water will circulate freely through the same; and I prefer to make it in the form of a cylinder, although the matter of form is not essential.

The primary feature of my improvement consists in dividing the percolator into two equal chambers, each of which may be charged and emptied independently of the other, and combining therewith means whereby the same may be suspended either end up. The object of this feature is to permit the charging of the chambers alternately, as thereby the coffee may be prepared from fresh and once-used grounds at each steeping. This manner of use of the utensil insures great economy of coffee, as its strength may be wholly extracted before it is thrown away. The other features of my invention will be understood from the description and drawings.

In the drawings, Figure 1 is a side view, and Fig. 2 a vertical section, of my improved percolator, the latter view being upon the line $x\ x$ of Fig. 1.

The same letters indicate like parts in both the figures.

A represents the body or cylindrical sides of my improved percolator. It is divided centrally by a transverse partition, B. At each end is a removable cap, C, which may be secured by any suitable fastening or by friction. D is a double-ended handle—that is to say, with both ends alike. It is passed through a loop, $a$, upon the side of the percolator, and it is intended to be held so closely in said loop that the percolator will be sustained without slipping wherever it is adjusted upon the handle. This permits the cook to immerse the whole or only a part of the percolator in the liquid, as is desired. The friction necessary for this result may be obtained through the medium of the rib or corrugation $d$, impressed upon the handle.

As shown, each end of the handle is bent over to form a hook, which may be slipped upon the edge of the pot, and the percolator thus suspended within the same. A handle of this description may be readily shortened, if desired, though that will be unnecessary in the majority of cases.

The handle is attached so that it lies longitudinally with reference to the percolator. The advantage of this is, that the percolator is always held end up, and the newer grounds are more readily distinguished, and need not be mistaken for the older. If the user has a rule as to which end—the top or the bottom—shall be filled with fresh coffee, no mistakes in emptying need occur.

I claim as new—

1. The percolator divided by a central transverse partition into two compartments, essentially as shown, and provided with a handle hooked at both ends, whereby the percolator may be suspended either end up, and the fresher charge may be distinguished from the older one, substantially as set forth.

2. The combination, with the percolator, of a handle whereby it may be suspended within the coffee-pot, and upon which it is adjustable, substantially as specified.

JOHN C. JENSEN.

Witnesses:
 EDW. S. EVARTS,
 JASON H. SHEPARD.